United States Patent
Chalfin et al.

(10) Patent No.: US 9,679,342 B2
(45) Date of Patent: Jun. 13, 2017

(54) RESULT DATA STREAM CODING FOR REPEATING WORKLOADS

(71) Applicant: ARM LIMITED, Cambridge (GB)

(72) Inventors: Alexander Eugene Chalfin, San Jose, CA (US); Bradley Albert Grantham, San Jose, CA (US)

(73) Assignee: ARM Limited, Cambridge (GB)

(*) Notice: Subject to any disclaimer, the term of this patent is extended or adjusted under 35 U.S.C. 154(b) by 499 days.

(21) Appl. No.: 13/940,716

(22) Filed: Jul. 12, 2013

(65) Prior Publication Data
US 2015/0015593 A1 Jan. 15, 2015

(51) Int. Cl.
| | |
|---|---|
| G06T 1/00 | (2006.01) |
| G06T 1/20 | (2006.01) |
| G06T 15/00 | (2011.01) |
| G06F 9/38 | (2006.01) |
| G06T 15/04 | (2011.01) |
| G09G 5/36 | (2006.01) |

(52) U.S. Cl.
CPC .............. *G06T 1/20* (2013.01); *G06T 15/005* (2013.01); *G06F 9/3851* (2013.01); *G06T 15/04* (2013.01); *G09G 5/363* (2013.01)

(58) Field of Classification Search
CPC ......... G06T 15/005; G06T 1/20; G06T 15/04; G09G 5/363; G06F 9/3851
USPC ................ 712/225, 214, 23, 217, 218, 243; 345/522, 423, 506
See application file for complete search history.

(56) References Cited

U.S. PATENT DOCUMENTS

| | | | |
|---|---|---|---|
| 5,767,858 A * | 6/1998 | Kawase .................. | G06T 15/04 345/552 |
| 5,845,103 A | 12/1998 | Sodani et al. | |
| 6,076,158 A * | 6/2000 | Sites ................... | G06F 9/30032 712/230 |
| 6,629,314 B1 | 9/2003 | Wu | |
| 6,925,550 B2 * | 8/2005 | Sprangle .............. | G06F 9/3836 712/214 |

(Continued)

FOREIGN PATENT DOCUMENTS

| | | |
|---|---|---|
| JP | 2004-258905 | 9/2004 |
| WO | 01/04746 | 1/2001 |

OTHER PUBLICATIONS

M. Thuresson et al., "Scalable Value-Cache Based Compression Schemes for Multiprocessors", Proceedings of the 18$^{th}$ International Symposium on Computer Architecture and High Performance Computing, 2006, 8 pages.

(Continued)

*Primary Examiner* — Abderrahim Merouan
(74) *Attorney, Agent, or Firm* — Nixon & Vanderhye P.C.

(57) ABSTRACT

A graphics processing pipeline includes a vertex transformation stage 14 having a vertex transformation cache 20. If a request to transform vertex data is received and the vertex transformation cache 20 indicates that the transformed vertex data for that received request has already been generated, then a pointer to that previously generated transformed vertex data is output within a result data stream in place of the transform vertex data. The transform vertex data is stored to a memory 10 before being retrieved as required by a rasterization stage 16.

23 Claims, 4 Drawing Sheets

(56) References Cited

U.S. PATENT DOCUMENTS

| | | | |
|---|---|---|---|
| 7,028,166 B2* | 4/2006 | Pickett | G06F 9/383 712/216 |
| 2004/0177236 A1* | 9/2004 | Pickett | G06F 9/383 712/225 |
| 2005/0114601 A1* | 5/2005 | Ramakrishnan | G06F 12/0802 711/118 |
| 2007/0050548 A1* | 3/2007 | Bali | G06F 12/0804 711/118 |
| 2008/0042830 A1* | 2/2008 | Chakraborty | G06K 7/0008 340/540 |
| 2008/0250232 A1 | 10/2008 | Nakashima | |
| 2011/0310102 A1* | 12/2011 | Chang | G06T 17/20 345/423 |
| 2014/0122847 A1* | 5/2014 | Henry | G06F 9/30076 712/243 |
| 2014/0168231 A1* | 6/2014 | Allen | G06T 1/20 345/506 |
| 2014/0267319 A1* | 9/2014 | Hakura | G06T 15/005 345/506 |
| 2014/0331016 A1* | 11/2014 | Dawson | G06F 9/45558 711/162 |
| 2014/0331017 A1* | 11/2014 | Dawson | G06F 9/45558 711/162 |

OTHER PUBLICATIONS

G. Pekhimenko et al., "Base-Delta-Immediate Compression: Practical Data Compression or On-Chip Caches", PACT'12, Sep. 19-23, 2012, ACM 978-1-4503-1182-3/12/09, 12 pages.

G. Keramidas et al., "Dynamic Dictionary-Based Data Compression for Level-1 Caches", Department of Electrical and Computer Engineering, University of Patras, retrieved Jul. 12, 2013, 15 pages.

UK Search Report dated Nov. 26, 2014 in GB 1408874.4, 3 pages.

* cited by examiner

RESULT DATA STREAM CODING FOR REPEATING WORKLOADS

BACKGROUND

This invention relates to the field of data processing systems. More particularly, this invention relates to data processing systems which receive a stream of requests to perform respective processing tasks and to generate corresponding blocks of result data values to be output as part of a result data stream.

There are many situations in which a data processing system may receive a stream of requests to perform respective processing tasks to generate corresponding blocks of result data values. One example of such systems is a graphics processing pipeline in which a vertex transformation stage receives requests to perform transform operations upon received vertex data to form transformed vertex data. The requests correspond to a stream of vertex data to be transformed and the blocks of result data correspond to a stream of transformed vertex data that is generated. In such embodiments, the stream of transformed vertex data is typically directly passed to a subsequent rasterization stage. A wide bus is used to pass the large volumes of data that is so generated. However, if a deferred rendering approach is adopted, then the transformed vertex data needs to be stored to memory before it is subsequently read by the rasterization stage. The large volumes of data which need to be transferred to and from memory in such situations represent a significant overhead in terms of both speed and power consumption.

SUMMARY

Viewed from one aspect the present invention provides a method of processing data comprising the steps of:
 receiving a stream of requests to perform respective processing tasks to generate corresponding blocks of result data values to be output as part of a result data stream;
 identifying if a received request within said stream of requests matches any of a set of previously received requests within said stream of requests for which a previous block of result data values was generated for output as part of said result data stream, and:
  (i) if said received request does not match any of said set of previously received requests, then performing a new processing task corresponding to said received request and generating a new block of result data values for output as part of said result data stream;
  (ii) if said received request does match a previously received request, then generating for output as part of said result data stream a pointer to said previous block of result data values within said result data stream.

The present technique recognises that in many real life workloads a received stream of requests to perform respective processing tasks often contains repeated requests to perform the same processing task. Performing the same processing task will generate the same block of result data values. Accordingly, if a previous request has resulted in generation of the same block of result data values for output then, instead of generating and outputting that same block of result data values for a second time, a pointer may instead be generated and output which identifies the previous block of result data values within the result data stream. This pointer value may be more compact than the block of result data values to which it points and accordingly there is a saving in the amount of data to be transferred. There is no loss of information as the block of result data values corresponding to the newly received request is identical to the previously generated block of result data values. A receiver of the result data stream receives blocks of result data values or pointers to previously received blocks of result data values that can be interpreted as corresponding to those previously received blocks of result data values. In this way, the receiver can reconstruct the result data stream into a form corresponding to that in which the present techniques have not been used if so desired.

It will be appreciated that it is desirable to reduce the data volume of the result data stream for a variety of reasons, such as reducing the overhead associated with the transmission of that result data stream. However, the present techniques are particularly useful when the result data stream is output to a memory as the present techniques can reduce the energy consumed in storing and retrieving that result data stream within the memory, as well as reducing the amount of memory space required and store the result data stream.

The identification of previously received requests matching a newly received request may be facilitated by storing within a cache memory tag values identifying a set of previously received requests. The step of identifying can compare a received tag value of a received request with the tag values stored within the cache memory. A match with any of the cached tag values indicates that a received request matches a previously received request and accordingly the block of result data values for that previously received request can be referenced using a pointer generated in response to the newly received request and that pointer output in the result data stream.

It will be appreciated that a cache memory has a finite amount of storage space and accordingly when a cache entry is to be evicted, its tag value will no longer be available in the cache to be compared with a tag value of a newly received request. Accordingly, the evicted previously received request is no longer a member of the set of previously received requests used in the step of identifying. In practice, the real life considerations which make cache memories effective in terms of the temporal and spatial locality with which memory accesses take place also tends to apply to received requests and accordingly similar requests may in practice be grouped together such that the effects of the need to evict the tags of previously received requests from the cache memory are mitigated.

The cache memory in some embodiments may store the pointer value of a previously block of result data values in association with each tag value. The pointer value could be stored with the tag value, in a separate data structure of its own, or with a block of data values stored within the cache memory for the tag value concerned.

The management of the pointer values may be conveniently provided in embodiments in which an index value is associated with each new block of result data values output as part of the result data stream. This index value may then be used as the pointer to that block of result data values when it is serving as a previously block of result data values that is to be referenced subsequently within the result data stream. It will be appreciated that the index value could take a variety of forms and in some embodiments may be a simple incrementing count value.

While not limited to one particular field of application, the present techniques find particular use in embodiments in which the processing tasks correspond to a processing stage within a graphics processing pipeline. Such processing typically involves large volumes of data and there is a relatively high likelihood of repetition within the blocks of result data values to be generated, e.g. vertex data may be transformed on multiple occasions due to the repeated use of the same vertex within multiple primitives of graphic data being manipulated. In such a context, the received requests are received by a vertex transformation stage, the processing tasks are vertex transformation operations and the stream of result data values is a stream of transformed vertex data.

Within this vertex transformation application, the step of identifying may compare a vertex identifier with vertex identifiers of previously transformed vertices Thus, the vertex identifier may be considered as a tag for a received request and for the corresponding block of result data values.

The stream of transformed vertex data may in some embodiments be stored to a memory by the vertex transformation stage and then read from the memory by a rasterization stage. Such deferred rendering graphics processing systems are advantageous for a number of reasons, but suffer from the disadvantage of potentially involving the transfer of large volumes of data to and from a memory. The present techniques reduce this overhead.

Viewed from another aspect the present invention provides apparatus for processing data comprising:
  receiving circuitry configured to receive a stream of requests to perform respective processing tasks to generate corresponding blocks of result data values to be output as part of a result data stream;
  identifying circuitry configured to identify if a received request within said stream of requests matches any of a set of previously received requests within said stream of requests for which a previous block of result data values was generated for output as part of said result data stream, and
  output generating circuitry configured to generate blocks of result data values in response to received requests, wherein
    (i) if said received request does not match any of said set of previously received requests, then using said output generating circuitry to perform a new processing task corresponding to said received request and to generate a new block of result data values for output as part of said result data stream;
    (ii) if said received request does match a previously received request, then using said output generating circuitry to generate for output as part of said result data stream a pointer to said previous block of result data values within said result data stream.

Viewed from a further aspect the present invention provides apparatus for processing data comprising:
  receiving means for receiving a stream of requests to perform respective processing tasks to generate corresponding blocks of result data values to be output as part of a result data stream;
  identifying means for identifying if a received request within said stream of requests matches any of a set of previously received requests within said stream of requests for which a previous block of result data values was generated for output as part of said result data stream, and
  output generating means for generating blocks of result data values in response to received requests, wherein
    (i) if said received request does not match any of said set of previously received requests, then using said output generating means to perform a new processing task corresponding to said received request and to generate a new block of result data values for output as part of said result data stream;
    (ii) if said received request does match a previously received request, then using said output generating means to generate for output as part of said result data stream a pointer to said previous block of result data values within said result data stream.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
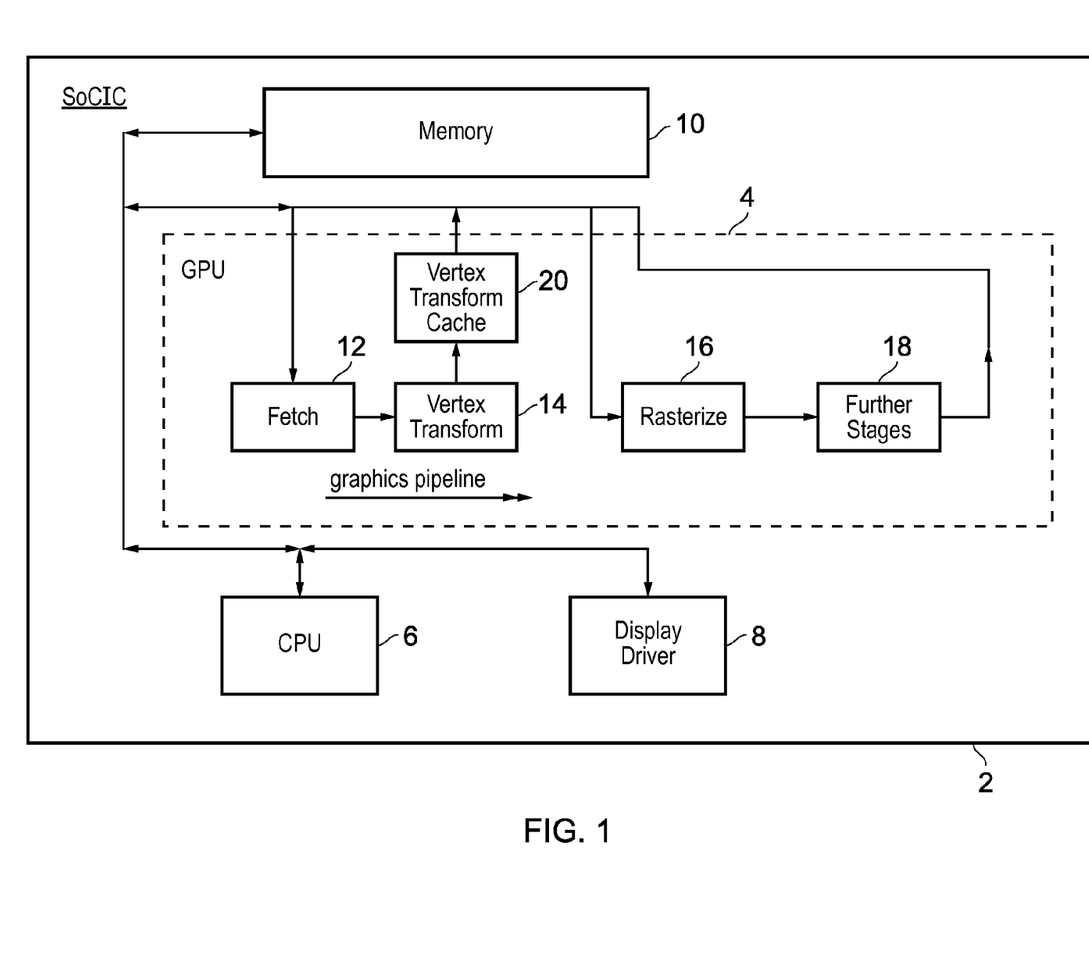
FIG. 1 schematically illustrates a system-on-chip integrated circuit including a graphics processing pipeline which stores transformed vertex data to a memory as part of deferred rendering.

FIG. 1 schematically illustrates a system-on-chip integrated circuit 2 including a graphics processing unit 4, a general purpose processor 6, a display driver 8 and a memory 10. The graphics processing unit 4 includes a graphics processing pipeline having a fetch stage 12, a vertex transformation stage 14, a rasterization stage 16 and one or more further stages 18. The vertex transformation stage 14 receives vertex data fetched from the memory 10 by the fetch stage 12. Receipt of vertex data corresponds to receive of a request to transform that vertex data and the vertex transformation stage 14 performs such a transformation. The transformed vertex data which is generated is stored within a vertex transform cache 20. The vertex transform cache may be used to suppress a requirement to repeatedly transform the same received vertex data and may store the transformed vertex data for reuse. Such transformed vertex data forms part of a result data stream comprising blocks of result data values which is stored back to the memory 10. The rasterization stage 16 retrieves this transformed vertex data from the memory 10 as required and performs raster processing thereon.

As well as storing previously generated blocks of result data values and suppressing the need to perform the same processing again to generate those blocks of result data values, the vertex transform cache 20 may be used to identify that identical previously generated blocks of result data values have been already sent to the memory 10 as part of the result data stream. Accordingly, instead of resending those same blocks of result data values out to the memory 10, a pointer to that previously generated block of result data values may be sent. This reduces the data volume transferred to and from the memory 10.

The rasterization stage 16 retrieves the blocks of result data values and the pointers from the memory 10. The rasterization stage 16 can reconstitute the full stream of transform vertex data from the coded stream of result data retrieved from the memory 10 and supply this for raster processing in the conventional manner.

The mesh of vertex data used to define a graphics image may be arranged such that repeatedly referenced vertices are close to each other in the time at which they are presented for transformation thereby increasing the likelihood that such repeated vertex transformations will be identified in the vertex transform cache 20 and accordingly repeated generation of the same data may be suppressed and repeated blocks of result data values comprising transformed vertex data may instead be placed by pointers to that transformed vertex data which have already been generated and output.

Figure 2:
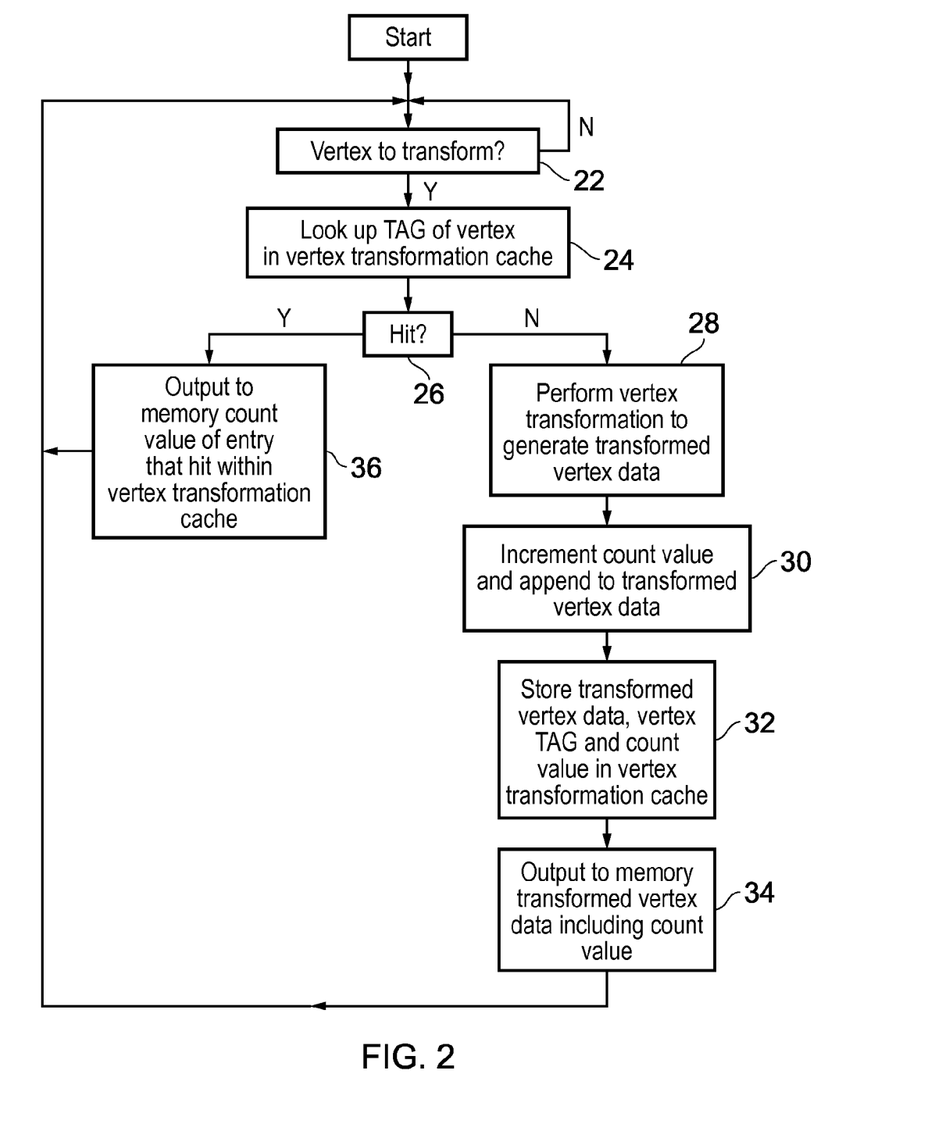
FIG. 2 is a flow diagram schematically illustrating the generation of a stream of transformed vertex data in response to receipt of requests to transform vertex data.

FIG. 2 is a flow diagram schematically illustrating receipt of a request to perform a processing task and the generation of a result data stream in accordance with the present techniques. At step 22, processing waits until the vertex transform stage 14 receives vertex data to transform. At step 24, a tag value of the received vertex data is looked up within the vertex transformation cache 20. The vertex transformation cache 20 may have varying degrees of associativity in accordance with normal cache techniques. The use of a fully associative or a set associative cache may improve efficiency.

Step 26 determines whether or not there was a hit within the vertex transformation cache 20. If there was no hit, then processing proceeds to step 28 where transformation processing is performed upon the received vertex data to generate transformed vertex data. Step 30 then increments a count value (to be used as a pointer/index) and appends this to the transformed vertex data. Step 32 stores the transformed vertex data, the vertex tag and the count value in the vertex transformation cache 20. Step 34 outputs to the memory 10 the transformed vertex data including the count value. Sending the count value together with the transformed vertex data that may later be pointed to using that count value facilitates the reconstruction of the full result data stream in subsequent processing.

If the determination at step 26 was that a hit has occurred within the vertex transformation cache 20, then processing proceeds to step 36. Step 36 outputs to the memory 10 the count value of the entry that hit within the vertex transformation cache 20. The occurrence of the hit indicates that the vertex received for transformation at step 22 has already been transformed and the transformed vertex data for that received vertex has already been output in previous processing (see step 34). Accordingly, data volume may be reduced by sending only a pointer to that previously generated and output transformed vertex data within the result data stream.

Figure 3:
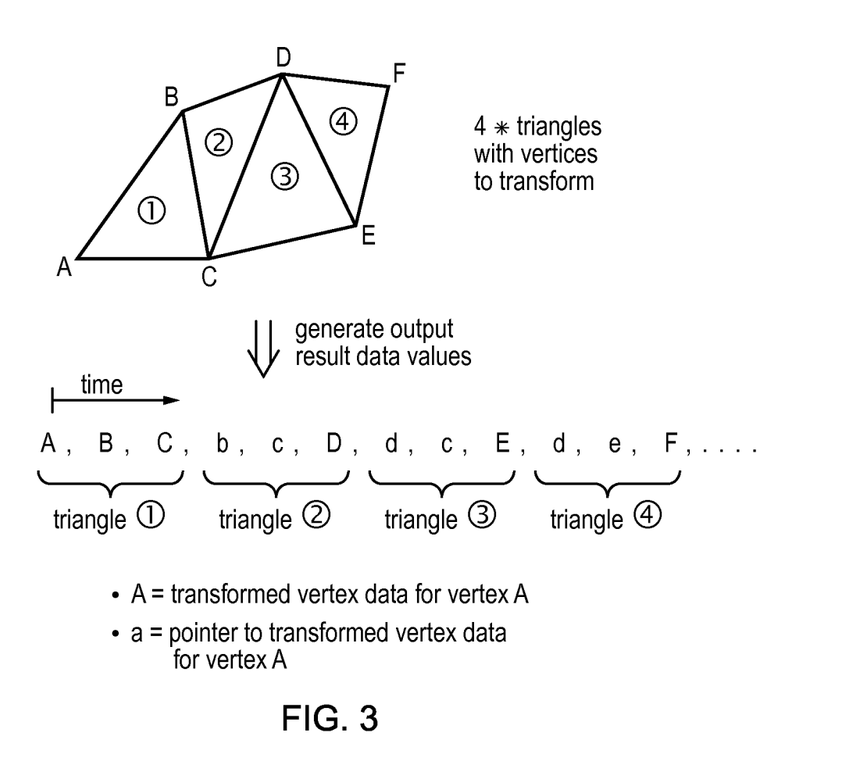
FIG. 3 schematically illustrates the generation of a result data stream including both blocks of result data and pointers to blocks of result data.

FIG. 3 schematically illustrates vertex transformation processing to generate a stream of transformed vertex data. The vertex data to be transformed represents four primitive triangles. The first primitive triangle has vertices A, B, C. The second primitive triangle has vertices B, C, D. The third primitive triangle has vertices C, D, E. The fourth primitive triangle has vertices D, E, F When the vertex data for these primitive triangles is sent to the vertex transformation stage 14 in the order of the first, second, third and fourth primitive triangles, then the resulting stream of transformed vertex data will be as illustrated.

In respect of the first triangle, the vertices A, B and C are encountered for the first time and accordingly the full transformed vertex data will be generated and output within the stream of transformed vertex data. In respect of the second primitive triangle, the vertices B and C have already been encountered and accordingly instead of generating the transformed vertex data and outputting that transformed vertex data, the vertex transformation stage 14 generates corresponding pointers b, c which identify the transformed vertex data B, C that has already been generated and output. The vertex D that forms part of the second primitive triangle has not been previously encountered and accordingly the transformed vertex data is output as D.

In respect of the third primitive triangle, the vertices D and C have been previously encountered and so pointers to the previously generated transformed vertex data are included within the result data stream. The vertex E has not been previously encountered and accordingly its full transformed vertex data will be output. In respect of the fourth primitive triangle, the vertices D and E have been previously encountered and accordingly pointers d, e will be output in their place. The vertex F has not been previously encountered and accordingly its full transformed vertex data is generated and output within the stream of transformed vertex data.

Figure 4:
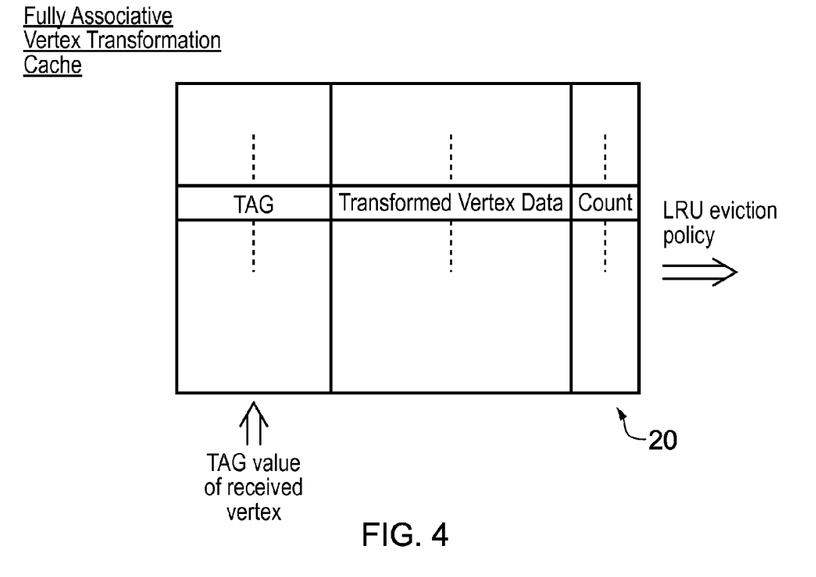
FIG. 4 schematically illustrates a cache memory for storing tag values, transformed vertex data and index values.

FIG. 4 schematically illustrates the vertex transformation cache 20. In this example, the vertex transformation cache 20 is shown as a fully associative cache such that a tag value of a received vertex is compared in parallel with all of the tag values stored as part of the vertex transformation cache 20. For each line of the cache there is stored a tag value, transformed vertex data and a count value to be used as a pointer/index within the result data stream in place of the transformed vertex data if this repeats within the result data stream while the transformed vertex data is still held within the vertex transformation cache 20.

The vertex transformation cache 20 may apply a least recently used eviction policy in order to manage its finite storage capacity. It will be appreciated that while FIG. 4 shows the tag value, the transformed vertex data and count value all on a single line, these may in practice be stored within separate structures or structures which partially or completely combine these value.

Figure 5:
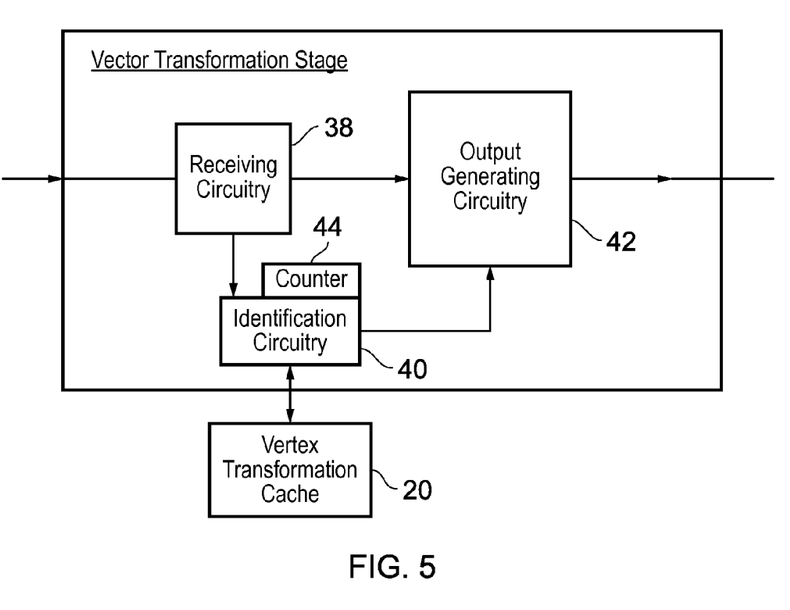
FIG. 5 schematically illustrates a vertex transformation stage.

FIG. 5 schematically illustrates the vertex transformation stage 14. The vertex transformation stage 14 includes receiving circuitry 38 for receiving requests to perform processing tasks in the form of vertex data to be transformed into transformed vertex data. Identification circuitry 40 serves to identify if a received request (vertex data) corresponds to any member of a set of previously received request (previously received vertex data). If there is a match, then this is signalled to the output generating circuitry which generates a pointer to that previously generated transformed vertex data rather than generating that transformed vertex data again and outputting that transformed vertex data again. The output generating circuitry 42 generates a stream of result data as illustrated in FIG. 3. A counter 44 serves to keep track of count values to be used as pointer values (index values).

It will be appreciated that the vertex transformation cache 20 has a finite storage capacity and the identification circuitry 40 compares a received request (vertex data) with the data stored within the vertex transformation cache 20 corresponding to a set of previously received requests (set of previously generated transformed vertex data). This set of previously received requests may not include all previously received requests due to the finite storage capacity of the vertex transformation cache 20 which applies an eviction policy, such as the least recently used eviction policy.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing data comprising the steps of:
receiving a stream of requests to perform respective processing tasks to generate corresponding blocks of result data values to be output as part of a result data stream to a memory;
identifying if a received request within said stream of requests matches any of a set of previously received requests within said stream of requests for which a previous block of result data values was generated for output as part of said result data stream, and:
  (i) if said received request does not match any of said set of previously received requests, then performing a new processing task corresponding to said received request and generating a new block of result data values for output as part of said result data stream;
  (ii) if said received request does match a previously received request, then generating for output as part of said result data stream to said memory, instead of another copy of said previous block of result data values, a pointer to said previous block of result data values within said result data stream.

2. A method as claimed in claim 1, comprising the step of:
storing within a cache memory tag values identifying said set of previously received requests; and wherein
said step of identifying compares a received tag value of said received request with said tag values stored within said cache memory.

3. A method as claimed in claim 2, wherein, when a victim tag value corresponding to a victim previously received request is evicted from said cache memory, then said victim previously received request is no longer a member of said set of previously received requests used in said step of identifying.

4. A method as claimed in claim 2, wherein said cache memory stores, in association with each tag value, said pointer to said previous block of result data values.

5. A method as claimed in claim 2, wherein said cache memory stores said blocks of result data values for said set of previously received requests.

6. A method as claimed in claim 1, comprising the step of:
associating an index value with each new block of result data values output as part of said result data stream; and wherein
said pointer comprises an index value of said previous block of result data values.

7. A method as claimed in claim 1, wherein said processing tasks correspond to a processing stage within a graphics processing pipeline.

8. A method as claimed in claim 7, wherein said received requests are requests received by a vertex transformation stage within said graphics processing pipeline to transform vertex data for a given vertex within graphics data, said processing tasks are vertex transformation operations performed upon said vertex data and said stream of result data values is a stream of transformed vertex data.

9. A method as claimed in claim 8, wherein said step of identifying compares a vertex identifier with vertex identifiers of a set of previously transformed vertices.

10. A method as claimed in claim 8, wherein said stream of transformed vertex data is passed to a rasterization stage within said graphics processing pipeline.

11. A method as claimed in claim 10, wherein said stream of transformed vertex data is stored to a memory by said vertex transformation stage and read from said memory by said rasterization stage.

12. Apparatus for processing data comprising:
a memory;
receiving circuitry configured to receive a stream of requests to perform respective processing tasks to generate corresponding blocks of result data values to be output as part of a result data stream to said memory;
identifying circuitry configured to identify if a received request within said stream of requests matches any of a set of previously received requests within said stream of requests for which a previous block of result data values was generated for output as part of said result data stream, and
output generating circuitry configured to generate blocks of result data values in response to received requests, wherein
  (i) if said received request does not match any of said set of previously received requests, then using said output generating circuitry to perform a new processing task corresponding to said received request and to generate a new block of result data values for output as part of said result data stream;
  (ii) if said received request does match a previously received request, then using said output generating circuitry to generate for output as part of said result data stream, instead of another copy of said previous block of result data values, a pointer to said previous block of result data values within said result data stream.

13. Apparatus as claimed in claim 12, comprising a cache memory configured to store tag values identifying said set of previously received requests, wherein said identifying circuitry is configured to compare a received tag value of said received request with said tag values stored within said cache memory.

14. Apparatus as claimed in claim 13, wherein, when a victim tag value corresponding to a victim previously received request is evicted from said cache memory, then said victim previously received request is no longer a member of said set of previously received request used in said step of identifying.

15. Apparatus as claimed in claim 13, wherein said cache memory is configured to store, in association with each tag value, said pointer to said previous block of result data values.

16. Apparatus as claimed in claim 13, wherein said cache memory is configured to store said blocks of result data values for said set of previously received requests.

17. Apparatus as claimed in claim 12, wherein said output generating circuitry is configured to associate an index value with each new block of result data values output as part of said result data stream and wherein said pointer comprises an index value of said previous block of result data values.

18. Apparatus as claimed in claim 12, wherein said receiving circuitry, said identifying circuitry and said output generating circuitry are all part of a processing stage within a graphics processing pipeline.

19. Apparatus as claimed in claim 18, wherein said received requests are requests received by a vertex transformation stage within said graphics processing pipeline to transform vertex data for a given vertex within graphics data, said processing tasks are vertex transformation operations performed upon said vertex data and said stream of result data values is a stream of transformed vertex data.

20. Apparatus as claimed in claim 19, wherein said identifying circuitry if configured to compare a vertex identifier with vertex identifiers of a set of previously transformed vertices.

21. Apparatus as claimed in claim 19, wherein said graphics processing pipeline comprises a rasterization stage and said stream of transformed vertex data is passed to said rasterization stage.

22. Apparatus as claimed in claim 21, comprising a memory and wherein said stream of transformed vertex data is stored to said memory by said vertex transformation stage and read from said memory by said rasterization stage.

23. Apparatus for processing data comprising:
 a memory;
 receiving means for receiving a stream of requests to perform respective processing tasks to generate corresponding blocks of result data values to be output as part of a result data stream to said memory;
 identifying means for identifying if a received request within said stream of requests matches any of a set of previously received requests within said stream of requests for which a previous block of result data values was generated for output as part of said result data stream, and
 output generating means for generating blocks of result data values in response to received requests, wherein
  (i) if said received request does not match any of said set of previously received requests, then using said output generating means to perform a new processing task corresponding to said received request and to generate a new block of result data values for output as part of said result data stream;
  (ii) if said received request does match a previously received request, then using said output generating means to generate for output as part of said result data stream, instead of another copy of said previous block of result data values, a pointer to said previous block of result data values within said result data stream.

\* \* \* \* \*